United States Patent [19]
Najjar et al.

[11] Patent Number: 5,310,414
[45] Date of Patent: May 10, 1994

[54] METHOD OF FORMING SEPARATION MEMBRANES

[75] Inventors: Mitri S. Najjar, Wappingers Fall, N.Y.; Robert S. Averback, Urbana, Ill.; Uygur Kokturk, Poughkeepsie; Martin D. Hilmar, Beacon, both of N.Y.

[73] Assignee: Texaco Inc., White Plains, N.Y.

[21] Appl. No.: 10,714

[22] Filed: Jan. 29, 1993

[51] Int. Cl.$^5$ .................... B01D 53/22; B01D 69/04; B01D 71/02
[52] U.S. Cl. .......................... 95/45; 95/56; 96/8; 96/10; 55/523; 55/524
[58] Field of Search .................. 55/16, 68, 158, 523, 55/524; 95/45, 55, 56; 96/4, 7, 8, 10

[56] References Cited

U.S. PATENT DOCUMENTS

| | | | |
|---|---|---|---|
| 2,958,391 | 11/1960 | de Rosset | 55/158 X |
| 3,022,187 | 2/1962 | Eyraud et al. | 55/158 X |
| 4,175,153 | 11/1979 | Dobo et al. | 55/16 X |
| 4,902,307 | 2/1990 | Gavalas et al. | 55/16 |
| 4,944,777 | 7/1990 | Shmayda et al. | 55/16 |
| 4,981,676 | 1/1991 | Minet et al. | 55/16 X |
| 5,069,794 | 12/1991 | Haag et al. | 55/16 X |
| 5,139,540 | 8/1992 | Najjar et al. | 55/16 |
| 5,160,352 | 11/1992 | Najjar et al. | 55/16 |
| 5,171,449 | 12/1992 | Pasternak et al. | 55/16 X |
| 5,183,482 | 2/1993 | Najjar et al. | 55/16 |

*Primary Examiner*—Robert Spitzer
*Attorney, Agent, or Firm*—George J. Darsa

[57] ABSTRACT

Gas mixtures such as $H_2/CO_2$ may be separated by passage through a filter bed of nanocrystalline ceramic particles on a bed of alumina particles.

5 Claims, No Drawings

METHOD OF FORMING SEPARATION MEMBRANES

FIELD OF THE INVENTION

This invention relates to novel membranes and to the method of preparation of these membranes. More particularly it relates to a method of separating a charge mixture which contains several components to permit attainment of a product stream which is enriched with respect to one of the components.

BACKGROUND OF THE INVENTION

As is well known to those skilled in the art, it is possible to treat charge mixtures by various techniques in order to recover one (or more) components in enriched or in pure form. In the case of liquids, this may commonly be effected by distillation or adsorption. In the case of gases, it is possible to effect separation by absorption or adsorption or by distillation of the liquified gases.

Although prior art attempts to separate gases, such as mixtures of hydrogen and carbon dioxide, by use of membrane technology have been heretofore considered, they have not been successful for many reasons. Among these may be noted the failure of the membranes due to mechanical defects (e.g. cracking) or the attainment of undesirably low Separation Factors and/or Flux.

It has also been difficult-to-impossible to fabricate membranes to be used in these processes because the fabrication processes were slow, difficult to control, produced unsatisfactory membranes, or required undesirable reagents (e.g. large quantities of water).

Background relating to this invention may be obtained from the article *The Sol-Gel Process* by Larry L. Hench and Jon K. West Chem. Rev. (1990) 90 33–72, which is incorporated herein by reference.

It is an object of this invention to provide a method of forming a membrane of an oxide of a metal such as aluminum characterized by its ability, when formed as a membrane, to separate components of charge streams. Other objects will be apparent to those skilled in the art.

STATEMENT OF THE INVENTION

In accordance with certain of its aspects, this invention is directed to a method of forming a separation membrane which comprises forming a fluidized stream of nanocrystalline ceramic particles:

passing said fluidized stream of particles of nanocrystalline size into contact with the surface of a bed of particles of metal oxide such as alumina of 200Å–12,500Å average diameter, said bed being characterized by pores of 100Å–2000Å average diameter whereby said particles of nanocrystalline ceramic powder are deposited on the surface of said bed of particles thereby forming a separation membrane of nanocrystalline ceramic powder on the surface of said bed of particles; and recovering said separation membrane of nanocrystalline ceramic powder on the surface of said bed of alumina particles.

In accordance with certain of its other aspects, this invention is directed to a method of forming a separation membrane which comprises maintaining a body of ceramic at or above vaporization conditions including temperatures of 1250° C.–2100° C. and pressure of inert gas of about 5–1000 millibars thereby vaporizing a portion of said ceramic which will condense to form nanocrystalline particles;

passing an inert gas into contact with said vaporized nanocrystalline particles thereby forming a flowing gas bearing vaporized nanocrystalline ceramic particles;

passing said flowing gas bearing vaporized nanocrystalline ceramic particles through a bed of alumina particles of 200Å–12,500Å average diameter, said bed being characterized by pores of 100Å–2000Å average diameter whereby said vaporized nanocrystalline ceramic particles is deposited on the surface of said filter bed of alumina particles thereby forming a separation membrane of nanocrystalline ceramic powder on said bed of alumina particles; and recovering said separation membrane of nanocrystalline ceramic particles on said bed of alumina particles.

DESCRIPTION OF THE INVENTION THE CARRIER LAYER

The porous ceramic carrier layer substrate which may be used in practice of the process of this invention may be a permeable composition which is stable under the conditions of preparation and operation. The preferred substrates may be formed of a metal oxide such as alumina, silica, silica-alumina, zirconia, silica-zirconia, alumina-zirconia, titania, silica-titania, alumina-titania, etc. The most preferred porous ceramic permeable carrier layer may be alumina, preferably alpha alumina, in the form of a disk or plate, cylinder or tube, etc. It is characterized by its stability and mechanical strength and by a macroporous structure.

THE POROUS SUPPORT LAYER

In practice of this process of this invention, according to one embodiment, a porous support layer is formed on the porous ceramic carrier layer.

When it is desired to employ a porous support layer on the porous ceramic layer, the latter in one embodiment may typically be first contacted with a blocking liquid. The blocking liquid may be a liquid which is preferably characterized by a low viscosity (typically below 20 cp, say 3–2.1 cp) at 21° C.–32° C., say ambient temperature so that it may readily be loaded onto the porous ceramic carrier layer and enter into the macropores thereof. It is also characterized by a high surface tension-typically above 5, say 10–50 dynes per cm and thus readily wets the ceramic porous support. The boiling point of the blocking liquid is preferably below about 100° C., say 40° C.–90° C. so that it may readily be volatilized during subsequent treatment.

Blocking liquid may be water, an alcohol, a ketone, an ester, an organic carboxylic acid, etc. Typical acids may include acetic acid, propionic acid, etc. Typical esters may include methyl acetate, ethyl acetate, methyl propionate, etc. Typical ketones may include acetone, methyl ethyl ketone, diethyl ketone, etc. Typical alcohols may include methanol, ethanol, n-propanol, i-propanol, etc. The preferred blocking liquids may include lower, water-soluble alcohols typified by methanol; and they may typically be used as 10 w %–90 w %, say 45 w % aqueous solutions thereof.

Loading of the blocking liquid onto the carrier layer may typically be effected at 20° C.–80° C., say 65° C. and atmospheric pressure as by spraying the liquid onto the surface of the porous ceramic carrier layer—typically for 0.5–15 minutes, say 1.5 minutes. When the porous ceramic support is a tube, typically of length of 40-100 cm, say 75 cm and inside diameter of 7-12 mm, say 8.5 mm, the blocking liquid may be typically maintained inside the tube during the loading period.

At the end of the loading period, the excess blocking liquid is removed from the surface of the porous ceramic carrier layer as by washing (e.g. with water) or by drying at about 20° C.-100°, say 26° C. for 20-60 minutes, say about 25 minutes. Preferably this is effected to yield a superficially dry surface.

On inspection (as by cutting out a section in a test piece), it is found that the blocking liquid has been adsorbed by and filled at least an outer layer of macropores of the ceramic carrier layer. Depending on the time of loading, the blocking liquid may fill pores throughout the entire body. Clearly longer times of loading will result in filling more pores.

The membrane layers of this invention may be formed on the porous ceramic support layer, bearing outer layers of macropores loaded with adsorbed blocking liquid, by use of a charge composition of aluminum alkoxide. Although it may be possible to prepare the novel membranes of this invention from a mono-alkoxide $Al(OR)X_2$ (wherein X represents another inert group) or from a dialkoxide $Al(OR)_2X$, it is preferred to utilize, as charge, a tri-alkoxide characterized by the formula $Al(OR)_3$.

In the above formula, R may be a hydrocarbon group selected from the group consisting of alkyl, aralkyl, cycloalkyl, aryl, and alkaryl including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalky, ether, etc. Typically inertly substituted R groups may include 2-ethoxyethyl, carboethoxymethyl, 4-methylcyclohexyl, etc. The preferred R groups may be lower alkyl, i.e. $C_1$-$C_{10}$ alkyl, groups including e.g. methyl, ethyl, n-propyl, i-propyl, butyls, amyls, hexyls, octyls, decyls, etc. R may preferably be isopropyl or sec-butyl.

The preferred aluminum alkoxides are those lower aluminum alkoxides wherein all the R groups are the same. Most preferred are aluminum tri-sec-butoxide and aluminum tri-isopropoxide. It is preferred to utilize the lower alkoxides because they are generally liquids at temperature of operation and for economic reasons (i.e. they contain a larger relative content of aluminum). Aluminum alkoxides are readily available commercially from various suppliers including Aldrich, Fisher, or Johnson Matthey.

In practice of the process of this invention, the charge e.g. $Al(OR)_3$ (referred to as an alkoxide, for convenience) is employed in liquid state. In the case of the higher alkoxides (typified by $Al(OR)_3$ wherein R is octadecyl) which are solid at operating temperature, they may be employed in admixture with an alcohol, preferably ROH i.e. wherein the R group is lower $C_1$-$C_5$ alkyl.

To the charge alkoxide (100 parts) at temperature of 100° C.-275° C., say 145° C., there is added 100-500, preferably 200 parts of liquid alcohol typically a lower $C_1$-$C_5$ alkanol such as isopropanol, and 0.5-7 parts, say 1 part of acid peptizing agent. Typical acid peptizing agents may include nitric acid, oxalic acid, or sulfuric acid. The preferred acid peptizing agent may be nitric acid.

The charge alkoxide liquid, containing peptizing agent, is hydrolyzed by contact with steam at 100° C.-275° C., say 56° C. and 1-150 psig, say 29 psig. During reaction over 0.5-30 minutes, say 20 minutes, the aluminum alkoxide is decomposed by the steam to yield alcohol and alkoxide in which some of the alkoxide groups have been replaced by —OH groups:

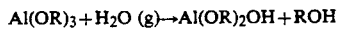

This reaction typically proceeds further to yield hydrolyzed polymer product

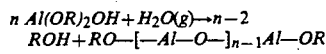

wherein n may be 100-10,000,000 say 10,000.

The hydrolyzed product of the reaction may be considered a stabilized/peptized colloidal sol of alumina in admixture with the alcohol originally present plus that formed during reaction. The alumina may bear RO- groups on the chain or more likely in terminal position. The alumina in the sol may be characterized by x-ray diffraction and nitrogen porosimetry. The hydrolyzed alumina sol contains gamma alumina with a Pore Mode of typically 4-45Å, preferably 7-15Å, say 13.6Å and a BET surface area of typically 150-400 m$^2$/g, typically 160-310 m$^2$/g, say 175 m$^2$/g. Preferably >70% of the Pores are <14Å.

Preparation of an alumina support layer assembly from the stabilized sol may be effected by various techniques. If it be desired to coat e.g. the inside of a tubular or cylindrical microporous support bearing blocking liquid, the sol in liquid phase may be steam sprayed through the tubular or cylindrical support to form thereon a membrane of alumina over 1-10, say 1.9 minutes at 50° C.-200° C., say 156° C. In another embodiment, the sol may be steam treated during preparation prior to deposition e.g. on the inside of the tube of alumina.

In still another embodiment, the sol may be deposited on the carrier layer and thereon contacted with steam at desired temperature and pressure. In another embodiment, the sol (containing water) may be deposited and steam treatment may be effected by reducing the pressure to generate steam in situ. In another embodiment the stabilized sol liquid may be poured as a thin layer on a flat surface. Excess liquid may be removed by drying at 20° C.-100° C., say about 25° C. for 20-60, say about 25 minutes followed by calcining at 400° C.-600° C., say 400° C. for 24-48 hours, say 34 hours.

Supported alumina membranes may be formed by coating a thin microporous support (formed typically of alpha alumina, carbon, porous glass, etc.) with the sol to attain a thin film on the surface thereof. This film-membrane may be dried at 20° C.-100° C., say about 25° C. for 20-60 minutes, say about 25 minutes, and then calcined at 400° C.-600° C., say 400° C. for 24-48 hours, say 34 hours.

The porous ceramic support layer bearing (i) outer layers of macropores loaded with adsorbed blocking liquid and (ii) a surface layer of alkoxide sol is subjected to a controlled drying at about 20° C.-100° C., preferably 20° C.-40° C., say about 25° C. at 1-130 psig, say 10 psig for 20-60 minutes, say about 25 minutes. During this controlled drying, the adsorbed blocking liquid migrates outwardly toward the surface of the porous ceramic support as the liquid evaporates. Simultaneously the liquid in the alkoxide sol layer migrates into the ceramic support layer—but the movement of the outwardly migrating blocking liquid toward the surface prevents substantial migration of the alkoxide sol from migrating too great a distance. Accordingly the drying alkoxide sol dries as a surface layer of depth of 8-200, say 30 microns.

At the end of the controlled drying period, the porous ceramic support contains a minimum of residual blocking liquid and it bears a surface layer of dried alkoxide sol.

The so-dried porous ceramic carrier layer, bearing a surface layer of dried alkoxide sol is heated at a rate of 5°-30° C./hr, say 10° C. per hour to calcining temperature and then is calcined at calcining temperature of 300° C.-500° C., preferably 400° C. for 24-48 hours, say 34 hours.

During calcining, the dried alumina sol is decomposed to form a thin porous layer of alumina. Typically this layer is of thickness of 8-200, say 30 microns. When desired, the deposition process may be repeated one or more additional times to obtain membranes of increasing thickness.

The membranes prepared by the process of this invention are typically characterized (by a high surface area and a narrow Pore Size Distribution) as follows:

TABLE

| Property | Broad | Narrow | Preferred |
|---|---|---|---|
| Surface Area by Cumulative Desorption m²/g | 4-300 | 100-250 | 225 |
| Multi-point BET m²/g | 150-300 | 140-275 | 162 |
| Pore Volume cc/g for: | | | |
| Pores <1857.2Å at P/Po = 0.005 | 2.8-70 | 16-25 | 24 |
| Cumulative Desorption 2000Å-12.5Å radius | 20-1500 | 80-1000 | 250 |
| Pore Mode | 8-1200 | 130-860 | 329 |
| Porosity % | 40-52 | 45-51 | 48.5 |

Preferably at least about 70% of the Pores have a Pore Radius of <1000Å.

THE CERAMIC SEPARATING LAYER

The ceramic which may be employed in practice of the process of this invention to form the ceramic separating layer may be typically characterized as an oxide or silicate (or a compound such as a carbonate which decomposes at conditions of operation to form oxide or silicate) of a metal. These ceramics are preferably oxides such as oxides of aluminum, zirconium, titanium, magnesium, iron, or palladium. They are commonly characterized by a melting point of above 2000° C. and typically 2000° C.-3000° C. The high melting oxide materials, such as MgO (mp 2852° C.), have a very high vapor pressure at temperatures well below their melting point.

Typical of such ceramics are:

TABLE

| magnesium | oxide |
|---|---|
| aluminum | oxide |
| zirconium | oxide |

TABLE-continued

| titanium | oxide |
|---|---|

Although it may be possible to employ ceramic materials of any size, it is preferred to utilize particles of diameter below about 200 microns. Most preferably the ceramic material may be used in the form of a fine powder of particle size less than about 150 microns. A typical preferred particle size may be 1-50 microns.

In practice of the process of this invention, the body of ceramic, preferably as a finely divided powder or pellets, may be heated to 1250° C.-2100° C., preferably 1450° C.-1925° C., say 1725° C. at pressure of 1-100 millibars, preferably 10-60, say 20 millibars.

At these conditions, a portion of the ceramic vaporizes to form vaporized particles of nanocrystalline size i.e. the average diameter of the vaporized particles is 2-20 nanometers (nm), preferably 4-20 nanometers, say about 15 nanometers; and the Particle Size Mode is about 4-25 nm, preferably 4-12 nm, say about 6 nm. (One nanometer equals 10Å).

There is passed over the vaporizing particles an inert gas. Typical inert gases may include nitrogen; ammonia; rare gases such as argon, helium, krypton, neon, xenon, etc. The preferred inert gas may be argon or helium.

The gas is passed over the body of vaporizing ceramic powder at a flow rate of about 2-25 liters/min, preferably 4-20 liters/min, say 6 liters/min.

In another embodiment, the gas may be employed as a fluidizing gas in a system wherein the ceramic particles (of about 2-20 nanometers average diameter) are maintained in a fluidized bed.

The flowing gas, withdrawn from contact with the vaporizing ceramic, contains nanocrystalline ceramic particles; and the entrained particles are collected on the surface and within the near surface region of the porous support layer. A vacuum may be drawn on the reverse side of the porous support to aid deposition of powder. The nanocrystalline particles are collected and become clogged on the first few layers of the porous carrier and they form a porous thin film over the substrate. The nanocrystalline particles become the limiting filter for subsequent particles. By in situ monitoring the flow rate, the resistance of the membrane fabricated from the thin nanofilm particles can be measured on line. To reduce the porosity and to improve the adhesion of the nanocrystalline particles to the substrate, the membrane system (nanocrystalline particles and porous support) may be sintered. Sintering may be effected by heating the assembly after the film is deposited. The size is controlled in the 5-40 nanometer range by varying the evaporation and gas flow rates or the pumping speed. Increasing the rate of evaporation or decreasing the inert gas flow rate yields larger particles. Increasing the temperature of vaporization also increases the particle size.

To reduce the porosity and improve the adherence of the nanocrystalline powder on the ceramic support, the membrane system (nanocrystalline powder plus porous support and carrier layer) is sintered. Sintering can be attained by heating the membrane after formation.

The so-dried porous ceramic carrier layer, bearing a surface layer of dried alkoxide sol is heated at a rate of 5°-30° C./hr, say 10° C. per hour to calcining temperature and then is calcined at calcining temperature of 300° C.-500° C., preferably 400° C. for 24-48 hours, say 34 hours.

During calcining, the dried alumina sol is decomposed to form a thin porous layer of alumina. Typically this layer is of thickness of 8–200, say 30 microns. When desired, the deposition process may be repeated one or more additional times to obtain membranes of increasing thickness.

The membranes prepared by the process of this invention are typically characterized (by a high surface area and a narrow Pore Size Distribution) as follows:

TABLE

| Property | Broad | Narrow | Preferred |
| --- | --- | --- | --- |
| Surface Area by Cumulative Desorption m$^2$/g | 4–300 | 100–250 | 225 |
| Multi-point BET m$^2$/g | 150–300 | 140–275 | 162 |
| Pore Volume cc/g for: | | | |
| Pores <1857.2Å at P/Po = 0.005 | 2.8–70 | 16–25 | 24 |
| Cumulative Desorption 2000Å–12.5Å radius | 20–1500 | 80–1000 | 250 |
| Pore Mode | 8–1200 | 130–860 | 329 |
| Porosity % | 40–52 | 45–51 | 48.5 |

Preferably at least about 70% of the Pores have a Pore Radius of <1000Å.

The membrane system so prepared may be used to separate liquids typified by methanol-water (Separation Factor of 4–7, say 5.1) or ethanol-water (Separation Factor of 7.2–9.5, say 8.1) or isopropanol-water (Separation Factor of 9–12, say 10.8). Gas streams may be separated—typified by a stream containing hydrogen and carbon dioxide.

The so-prepared porous ceramic carrier layer characterized by mechanical strength and bearing the intermediate porous support layer may be further treated to form thereon a non-porous separating layer which may be used to separate mixtures of fluids.

The filter bed of particles which may be employed in practice of the process of this invention includes a body of alumina particles. The bed is typically of thickness of 5–250 microns, preferably 10–40 microns, say 25. The alumina particles may be of average diameter of 5Å–1000Å, preferably 10Å–250Å, say 20Å. The bed of alumina particles is characterized by pore spaces of diameter of 10Å–1250Å, preferably 12Å–300Å, say 23Å.

The filter bed may be prepared by depositing aluminum hydroxide on a support and drying and calcining the deposit to yield a bed of alumina.

Although it may be possible to prepare the novel membranes of this invention from a mono-alkoxide Al(OR) X$_2$ (wherein X represents another inert group) or from a dialkoxide Al(OR)$_2$X, it is preferred to utilize, as charge, a tri-alkoxide characterized by the formula Al(OR)$_3$.

In the above formula, R may be a hydrocarbon group selected from the group consisting of alkyl, aralkyl, cycloalkyl, aryl, and alkaryl including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclo- octyl, 2-methylcycloheptyl, 3-butylcyclohexyl, 3-methylcyclo- hexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalky, ether, etc. Typically inertly substituted R groups may include 2-ethoxyethyl, carboethoxymethyl, 4-methylcyclo- hexyl, etc. The preferred R groups may be lower alkyl, i.e. C$_1$-C$_{10}$ alkyl, groups including e.g. methyl, ethyl, n-propyl, i-propyl, butyls, amyls, hexyls, octyls, decyls, etc. R may preferably be iso-propyl or sec-butyl.

The preferred aluminum alkoxides are those lower aluminum alkoxides wherein all the R groups are the same. Most preferred are aluminum tri-sec-butoxide and aluminum tri-iso-propoxide. It is preferred to utilize the lower alkoxides because they are generally liquids at temperature of operation and for economic reasons (i.e. they contain a larger relative content of aluminum). Aluminum alkoxides are readily available commercially from various suppliers including Aldrich, Fisher, or Johnson Matthey.

In practice of the process of this invention, the charge Al(OR)$_3$ (referred to as an alkoxide, for convenience) is employed in liquid state. In the case of the higher alkoxides (typified by Al(OR)$_3$ wherein R is octadecyl) which are solid at operating temperature, they may be employed in admixture with an alcohol, preferably ROH i.e. wherein the R group is lower C$_1$-C$_5$ alkyl.

To the charge alkoxide (100 parts) at temperature of 100° C.–275° C., say 145° C., there is added 100–500, preferably 200 parts of liquid alcohol typically a lower C$_1$-C$_5$ alkanol such as isopropanol, and 0.5–7 parts, say 1 part of acid peptizing agent. Typical acid peptizing agents may include nitric acid, oxalic acid, or sulfuric acid. The preferred acid peptizing agent may be nitric acid.

The charge alkoxide liquid, containing peptizing agent, is hydrolyzed by contact with steam at 100° C.–275° C., say 156° C. and 1–150 psig say 29 psig. During reaction over 0.5–30 minutes, say 20 minutes, the aluminum alkoxide is decomposed by the steam to yield alcohol and alkoxide in which some of the alkoxide groups have been replaced by —OH groups:

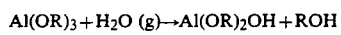

Al(OR)$_3$+H$_2$O (g)→Al(OR)$_2$OH+ROH

This reaction typically proceeds further to yield hydrolyzed polymer product

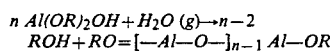

n Al(OR)$_2$OH+H$_2$O (g)→n−2
ROH+RO=[—Al—O—]$_{n-1}$ Al—OR wherein n may be 100–10,000,000 say 10,000.

The hydrolyzed product of the reaction may be considered a stabilized/peptized colloidal sol of alumina in admixture with the alcohol originally present plus that formed during reaction. The alumina may bear RO— groups on the chain or more likely in terminal position. The alumina in the sol may be characterized by x-ray diffraction and nitrogen porosimetry. The hydrolyzed alumina sol contains gamma alumina with a Pore Mode of typically 4–45Å, preferably 7–15Å, say 13.6Å and a BET surface area of typically 150–400 m$^2$/g, typically 160–310 m$^2$/g, say 175 m$^2$/g. Preferably >70% of the Pores are <14Å.

Preparation of an alumina membrane assembly from the stabilized sol may be effected by various techniques. If it be desired to coat e.g. the inside of a tubular or cylindrical microporous support bearing blocking liquid, the sol in liquid phase may be steam sprayed through the tubular or cylindrical support to form thereon a membrane of alumina over 1–10, say 1.9 minutes at 50° C.–200° C., say 156° C. In another embodiment, the sol may be steam treated during preparation prior to deposition e.g. on the inside of the tube of alumina.

In still another embodiment, the sol may be deposited on the support and thereon contacted with steam at desired temperature and pressure. In another embodiment, the sol (containing water) may be deposited and steam treatment may be effected by reducing the pressure to generate steam in situ. In another embodiment the stabilized sol liquid may be poured as a thin layer on a flat surface. Excess liquid may be removed by drying at 20° C.-100° C., say about 25° C. for 20-60, say about 25 minutes followed by calcining at 400° C.-600° C., say 400° C. for 24-48 hours, say 34 hours.

The flowing gas bearing vaporized nanocrystalline ceramic powder is passed into contact with and through the filter bed of alumina particles at 15° C.-800° C., preferably 400° C.-600° C., say 525° C. at 20-100 millibars, preferably 60-90 millibars, say 75 millibars. As the gas passes through the filter bed of alumina particles, the vaporized nanocrystalline ceramic powder is deposited on the surface and in the interstitial pores of the filter bed to form a separating layer of thickness of 1-40 microns, preferably 3-10 microns, say 7 microns over 10-240, preferably 40-120, say 108 minutes.

The deposited layer of ceramic particles is characterized by an average particle size of 4-40 nanometers preferably 6-20 nanometers, say about 15 nanometers. The layer is characterized by pores of average size of 4-40 nanometers, preferably 5-20 nanometers, say 6 nanometers.

The separation membranes prepared by the process of this invention, whether on a supporting membrane or other structure, are particularly characterized by their ability to separate charge gas streams into their several components. For example, it is possible to treat gas streams containing various combinations of gases such as hydrogen, nitrogen, carbon monoxide, carbon dioxide, ammonia, hydrogen sulfide, hydrocarbons, inert gases, etc. to yield a product which is desirably enriched (or depleted) in one of the components. Typical charge systems which may be treated include hydrogen/carbon dioxide, hydrogen/nitrogen, nitrogen/carbon dioxide, etc. It is preferred that the charge stream be dry i.e. that it contain less than about 100 ppm of water and that it be free of strongly acid gases such as hydrogen chloride i.e. less than about 1 ppm.

Separation of the charge gas may be effected by passing the charge gas at 10° C.-500° C., say 170° C. and 1-600 psig, say 25 psig into contact with the membrane at a flow rate of 15-110 moles/sec, say 75 moles/sec.

During typical operation, charge containing say hydrogen (48 v %), and carbon dioxide (52 v %) may yield permeate containing 95 v % hydrogen and 5 v % carbon dioxide at a Flux of 1.1-1.4, say $1.2 \times 10^{-4}$ moles/cm$^2$ sec and a Separation Factor of 3.8-7.4, say about 5.5.

DESCRIPTION OF PREFERRED EMBODIMENTS

Practice of the process of this invention may be apparent to those skilled in the art from the following wherein all parts are parts by weight unless otherwise indicated. An asterisk (*) indicates a control example.

EXAMPLE I

In this example which sets forth the best mode presently known of carrying out the process of this invention, the porous support is prepared by deposition on a disc of alpha alumina 47 cm diameter of thickness of 0.25 cm which serves as carrier layer. The sheet has pores of average diameter of about 10 microns.

Aluminum hydroxide is formed by mixing 100 parts of aluminum tri-isopropoxide with 200 parts of isopropanol and 1 part of nitric acid peptizing agent. Hydrolysis is effected by passing steam (159° C./29 psig) through the mixture at a rate of about 300 cc/sec for 20 minutes.

The hydrolyzed sol is passed into contact with the disc carrier layer whereon it is maintained for 2 minutes at 159° C. The liquid is then poured off and the sheet is dried by contact with air at 24° C. and 10 psig for 15 minutes.

The dried structure is heated (ca 10° C./hr) to 400° C. at which temperature it is maintained for 34 hours. It is then cooled (ca 10° C./hr) to ambient temperature.

The product membrane (7 microns thick) is characterized as follows:

TABLE

| Property | Value |
| --- | --- |
| Thickness (microns) | 7 |
| Porosity % | 49 |
| Surface m$^2$/g | 160 |
| Pore Mode Å Diameter | 1100 |

In practice of the process of this invention, ceramic particles of magnesium oxide of average particle size of about 3-10 microns are heated to 1450° C. in a tungsten boat. The boat current is 600-700 amps AC at $2 \times 10^{-7}$ Torr base pressure of the chamber for a deposition time of 118 minutes as inert argon (>99 v % purity) is passed thereover. The ceramic particles are agitated and intimately mixed with flowing argon gas. The flowing argon gas, exiting the reactor bars particles of magnesium oxide of average particle size of 2-20 nanometers.

The flowing gas bearing the magnesium oxide particles is passed through the dried, calcined alumina structure at 620° C. and 700 millibars over 25 minutes during which time there is deposited a layer of magnesium oxide of thickness of 7 microns. The deposited layer of nanocrystalline magnesium oxide is characterized by an average particle size of about 4 nanometers and an average pore diameter of about 2.5 nanometers.

In practice of the process of this invention, there is passed to the charge side of this membrane a gas mixture at 130° C. and 16 psig containing 48 v % hydrogen and 52 v % carbon dioxide. The permeate/discharge side of the membrane is at atmospheric pressure. After equilibrium is established (60 minutes), it is observed that the permeate gas contains 95 v % hydrogen and 5 v % carbon dioxide. The Flux is 1.2 moles/cm$^2$ sec$\times 10^4$.

EXAMPLE II*

In this Control Example, the procedure of Example I is duplicated except that no magnesium oxide is deposited on the alumina.

The permeate gas contains only 68 v % hydrogen and 32 v % carbon dioxide. The Flux is 1.6 moles/cm$^2$ sec$\times 10^4$.

EXAMPLE III-VI

Results comparable to those attained in Example I may be attained if the nanocrystalline crystalline ceramic material is:

| Example | Ceramic Material |
|---------|------------------|
| III | $ZrO_2$ |
| IV | $TiO_2$ |
| V | $Al_2O_3$ |
| VI | $Y_2O_3$ |

EXAMPLE VII-IX

Results comparable to those attained in Example I may be attained if charge gas is:

| Example | Charge gas |
|---------|------------|
| VII | 45 v % hydrogen |
|     | 55 v % nitrogen |
| VIII | 50 v % hydrogen |
|      | 50 v % helium |
| IX | 54 v % carbon monoxide |
|    | 46 v % hydrogen |

Although this invention has been illustrated by reference to specific embodiments, it will be apparent to those skilled in the art that various changes and modifications may be made which clearly fall within the scope of the invention.

What is claimed is:

1. The method of separating a charge gas mixture containing a more permeable gas and a less permeable gas which comprises maintaining a separation membrane including a support of metal oxide particles bearing, as separating layer thereon a separating layer of deposited nanocrystalline ceramic powder of average particle diameter of 200Å-2,500Å, of pores of average diameter of 1000Å-2000Å, and of thickness of 5-250 microns;

passing a charge gas mixture containing a more permeable gas and a less permeable gas into contact with said separation membrane;

maintaining a pressure on the charge side of said membrane greater than the pressure on the permeate side of said membrane thereby yielding a permeate containing increased quantity of said more permeable gas and decreased quantity of said less permeable gas and retentate containing decreased quantity of said more permeable gas and an increased quantity of said less permeable gas;

recovering said permeate containing increased quantity of said more permeable gas and decreased quantity of said less permeable gas; and recovering said retentate containing decreased quantity of said more permeable gas and an increased quantity of said less permeable gas.

2. A membrane comprising a nanocrystalline ceramic body of thickness of 5-25 microns containing nanocrystalline ceramic particles of 200Å-12,500Å average diameter, and containing pores of average diameter of 1000Å-2000Å.

3. The method of forming a separation membrane which comprises forming a fluidized stream of particles of nanocrystalline ceramic powder;

passing said fluidized stream of particles of nanocrystalline ceramic powder into contact with the surface of a bed of metal oxide particles of 200Å-12,000Å average diameter, said bed being characterized by pores of 100Å-2000Å average diameter whereby said particles of nanocrystalline ceramic powder are deposited on the surface of said bed of metal oxide particles thereby forming a separation membrane of nanocrystalline ceramic powder on the surface of said bed of particles; and recovering said separation membrane of nanocrystalline ceramic powder on the surface of said bed of particles.

4. The method of forming a separation membrane as claimed in claim 3 wherein said nanocrystalline ceramic powder is an oxide of magnesium, aluminum, titanium, or zirconium.

5. The method of forming a separation membrane which comprises maintaining a body of ceramic at or above vaporization conditions including temperature of 1250° C.-2100° C. and pressure of inert gas of about 500-1000 millibars thereby vaporizing a portion of said ceramic as vaporized nanocrystalline ceramic particles which will condense to form nanocrystalline particles;

passing an inert gas into contact with said vaporized nanocrystalline ceramic particles thereby forming a flowing gas bearing vaporized nanocrystalline ceramic particles;

passing said flowing gas bearing vaporized nanocrystalline ceramic particles through a bed of alumina particles of 200Å-12,500Å average diameter, said bed being characterized by pores of 100Å-2000Å average diameter whereby said vaporized nanocrystalline ceramic particles are deposited on the surface of said bed of alumina particles thereby forming a separation membrane of nanocrystalline ceramic particles on said bed of alumina particles; and recovering said separation membrane of nanocrystalline ceramic particles on said bed of alumina particles.

* * * * *